June 20, 1944. I. H. C. GREEN 2,351,758
KNITTED FABRIC AND METHOD OF MAKING THE SAME
Filed Feb. 6, 1943 15 Sheets-Sheet 1
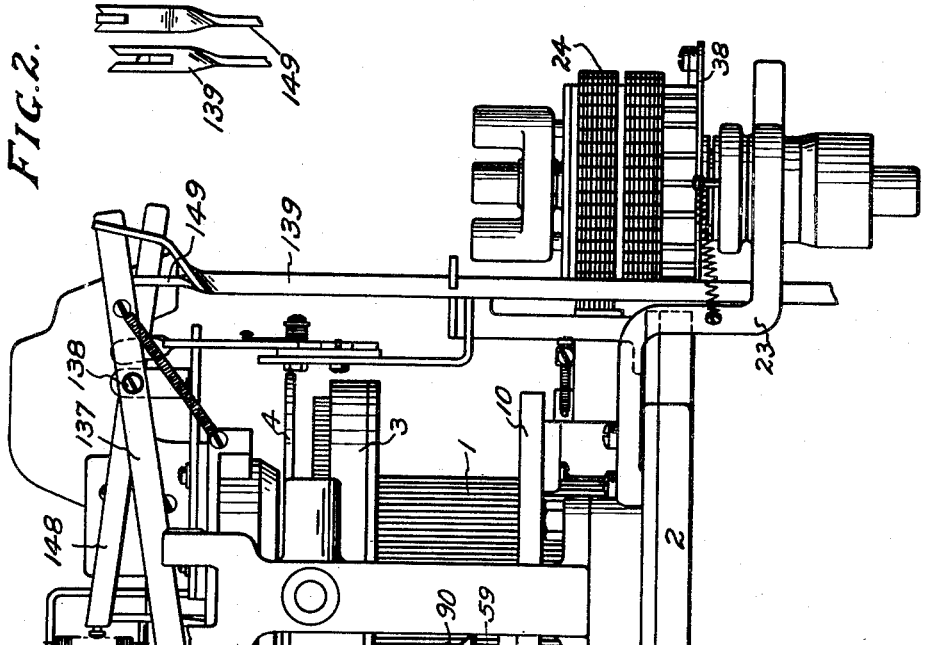
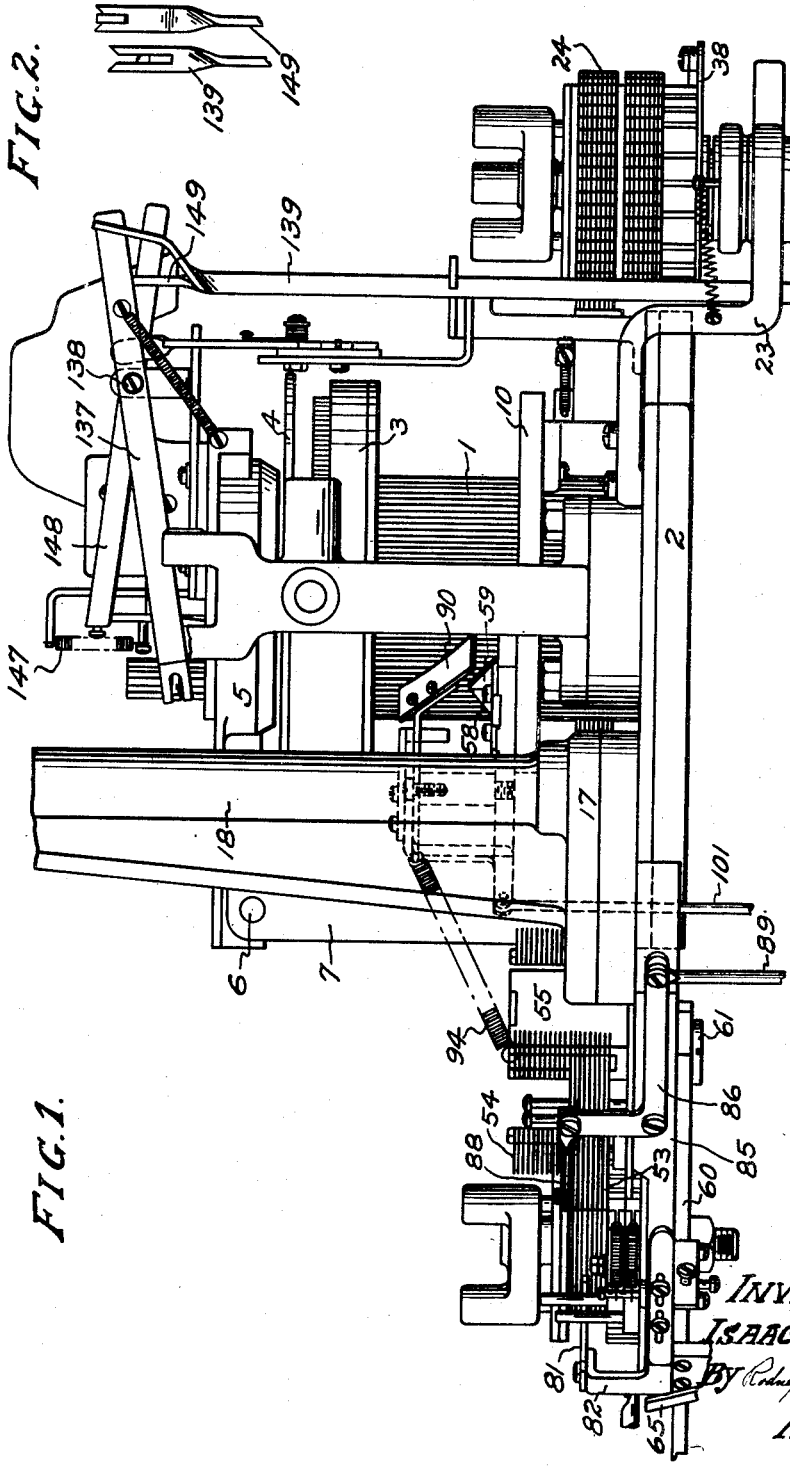
INVENTOR:
ISAAC H.C. GREEN,
BY Rodney C. Sanborn
ATT'Y.

June 20, 1944.　　　I. H. C. GREEN　　　2,351,758
KNITTED FABRIC AND METHOD OF MAKING THE SAME
Filed Feb. 6, 1943　　　15 Sheets-Sheet 2

INVENTOR:
ISAAC H. C. GREEN,
By Rodney C. Southworth
ATT'Y.

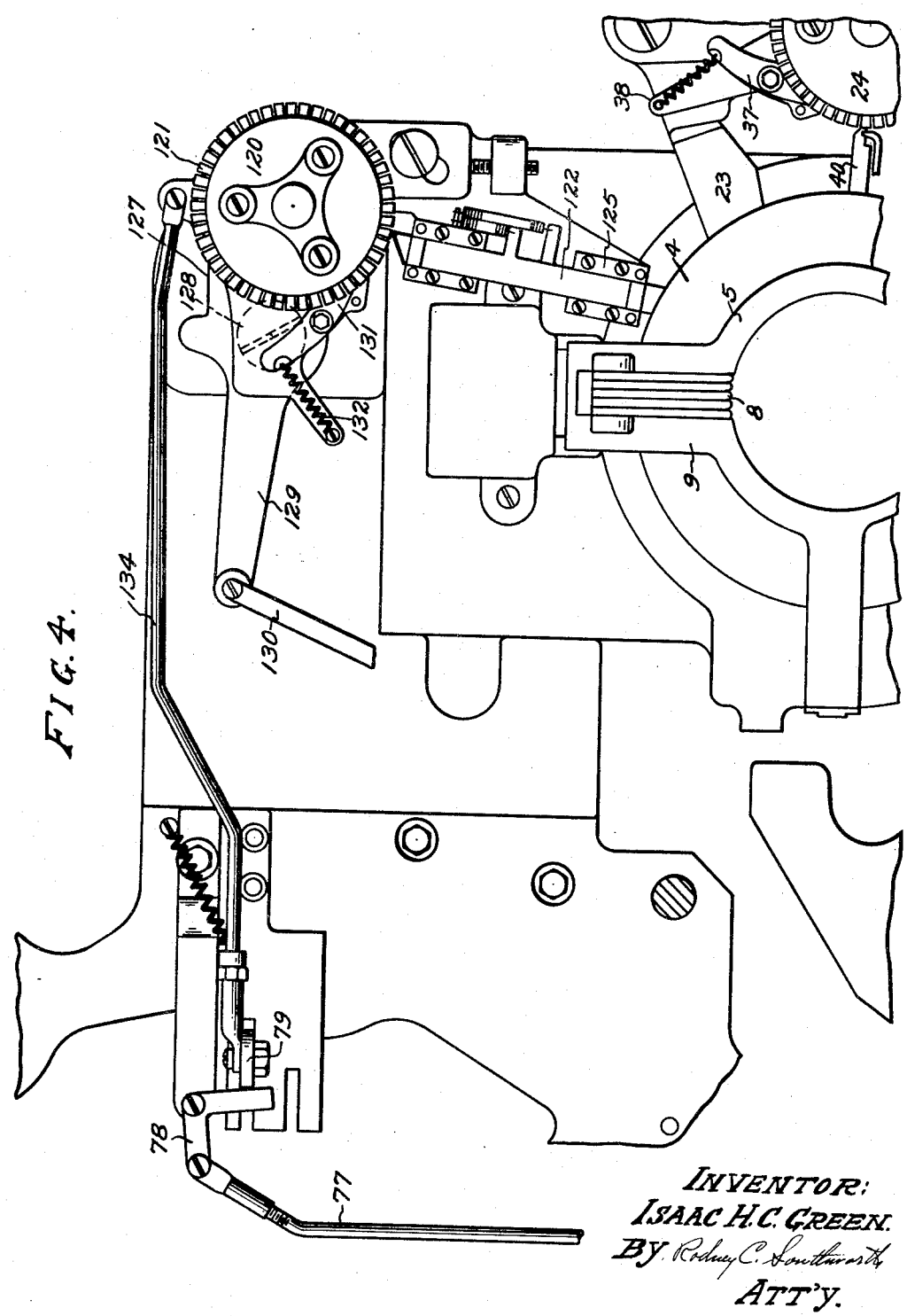

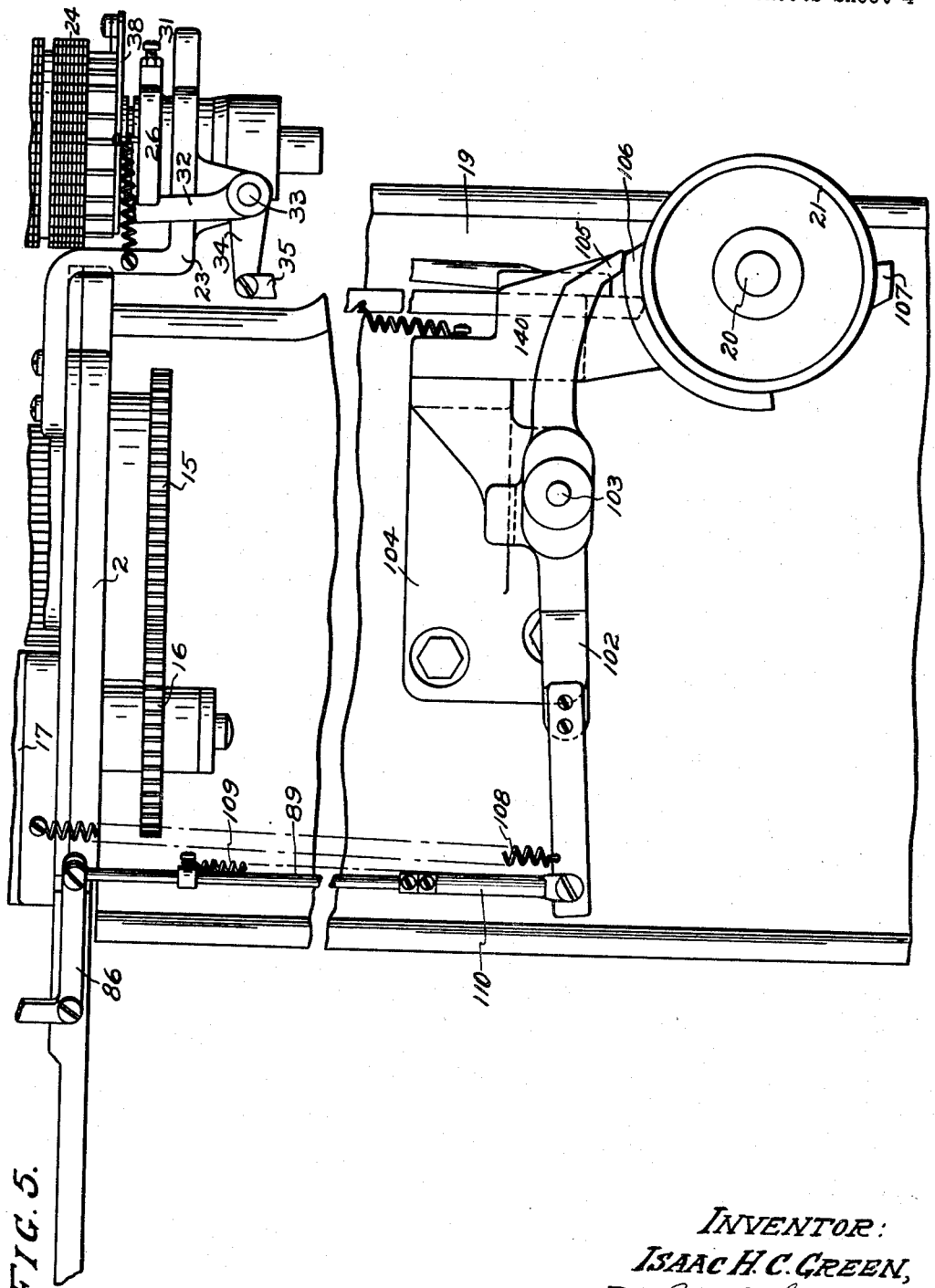

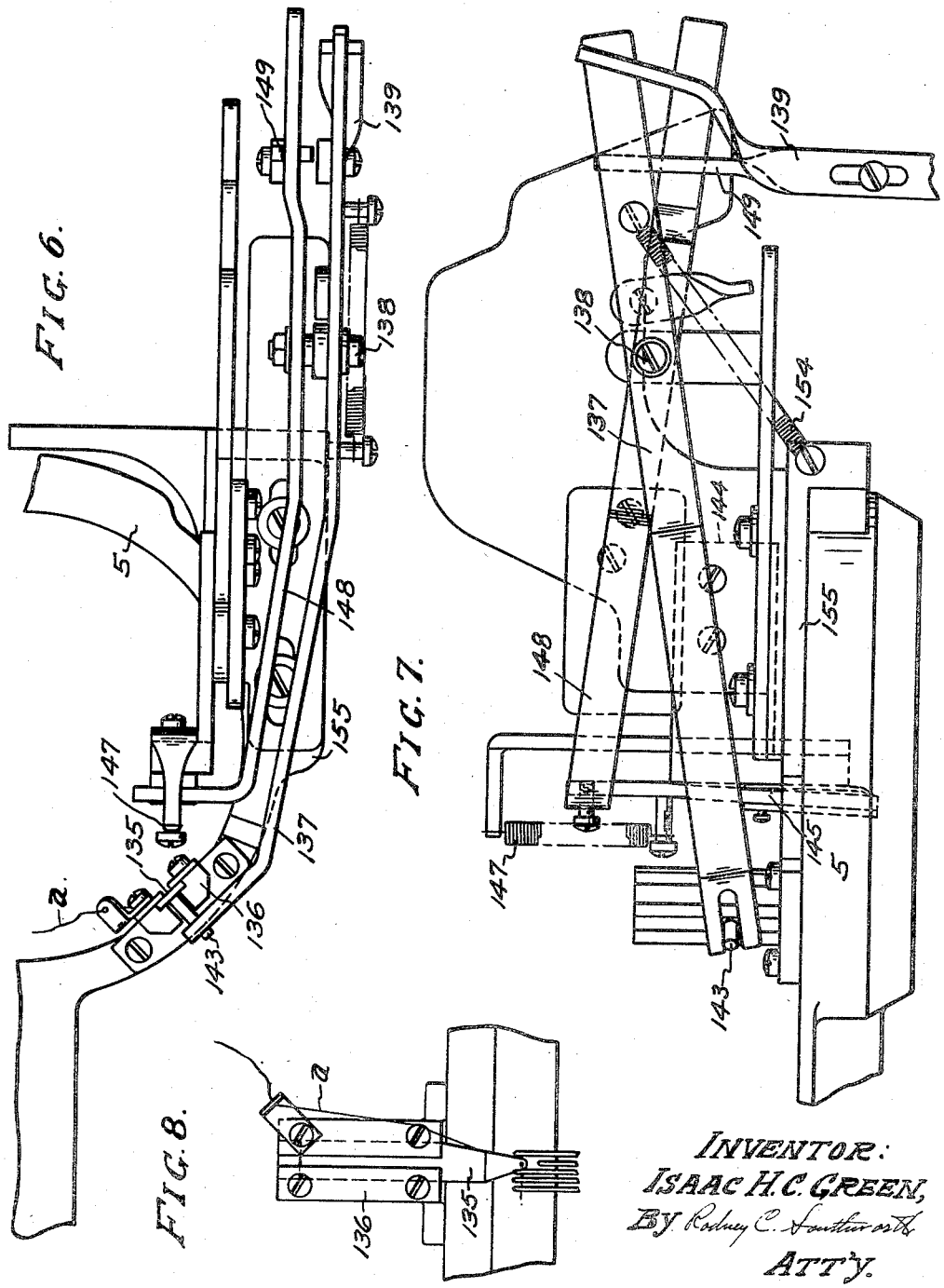

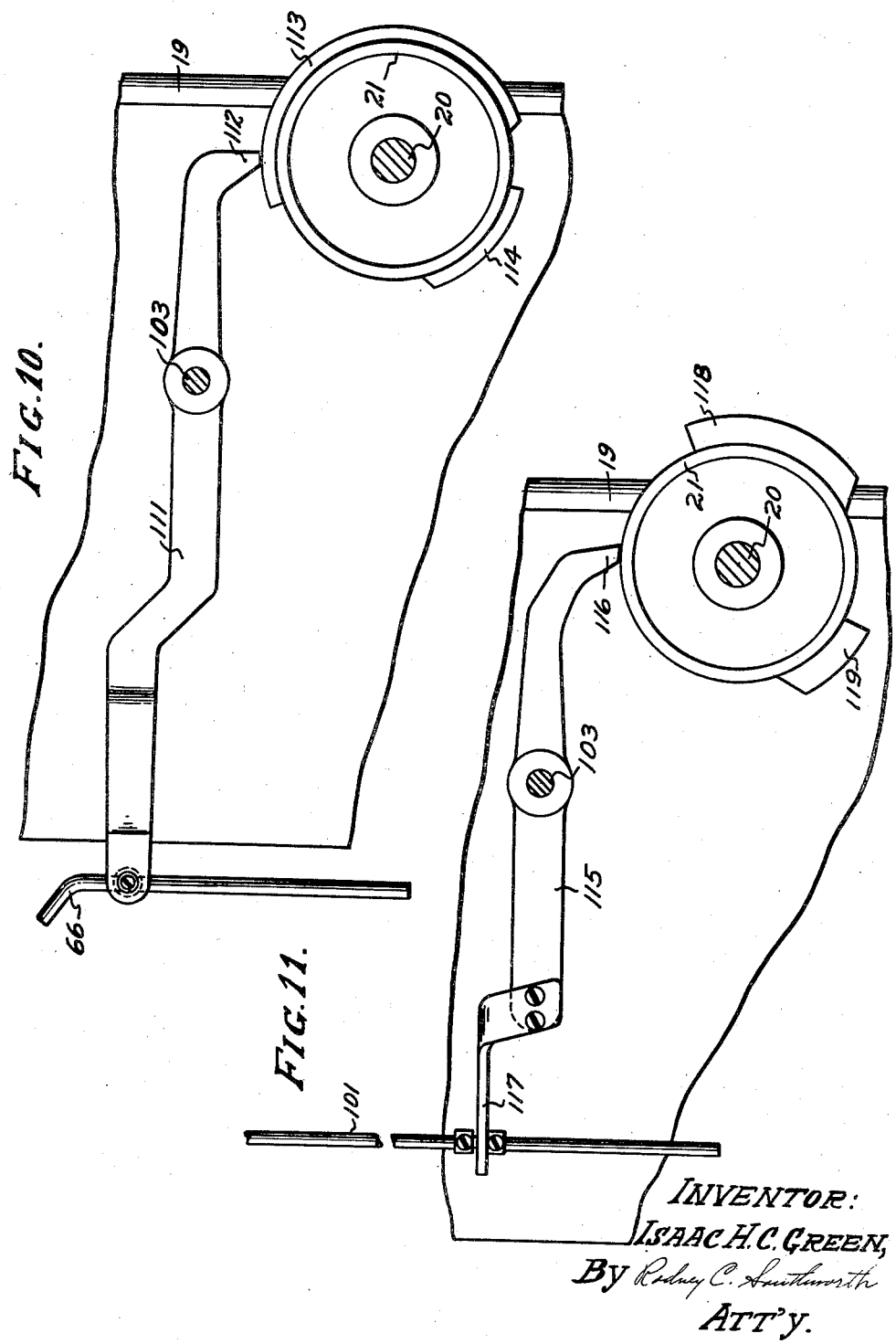

June 20, 1944.  I. H. C. GREEN  2,351,758
KNITTED FABRIC AND METHOD OF MAKING THE SAME
Filed Feb. 6, 1943  15 Sheets-Sheet 8

INVENTOR:
ISAAC H. C. GREEN,
By Rodney C. Southworth
ATT'Y.

INVENTOR:
ISAAC H. C. GREEN,
BY Rodney C. Southworth
ATT'Y.

June 20, 1944.　　　I. H. C. GREEN　　　2,351,758
KNITTED FABRIC AND METHOD OF MAKING THE SAME
Filed Feb. 6. 1943　　　15 Sheets-Sheet 10
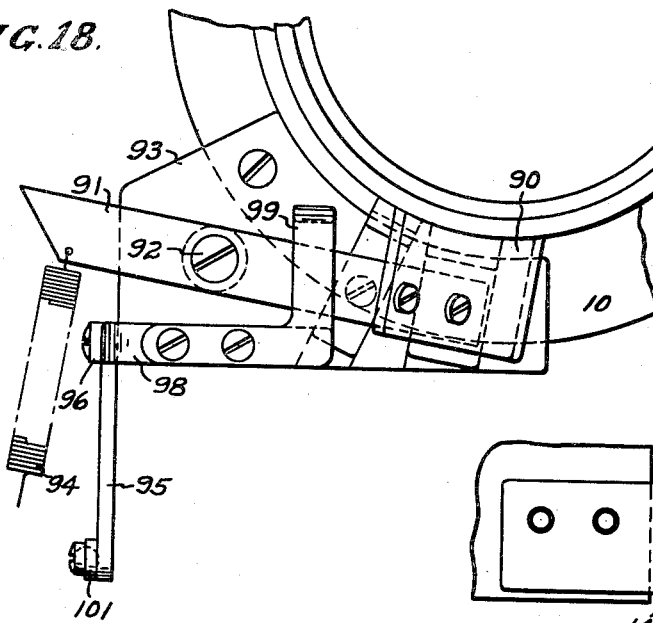
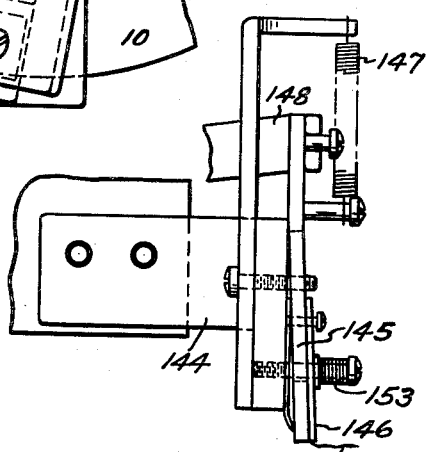
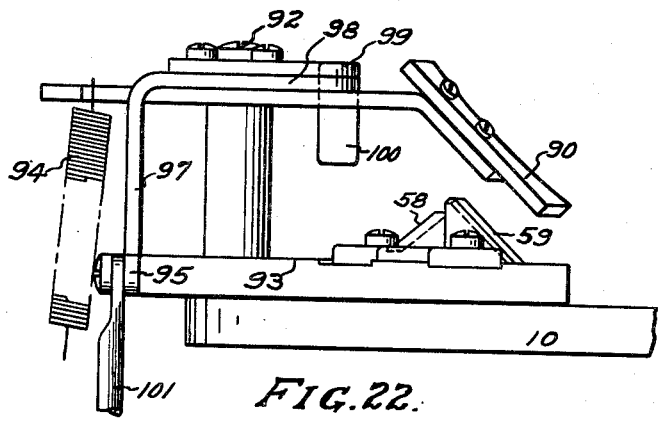
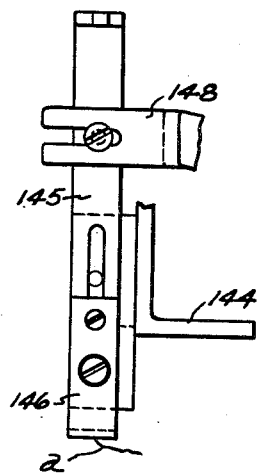
INVENTOR:
ISAAC H. C. GREEN,
By Rodney C. Southworth
ATT'Y.

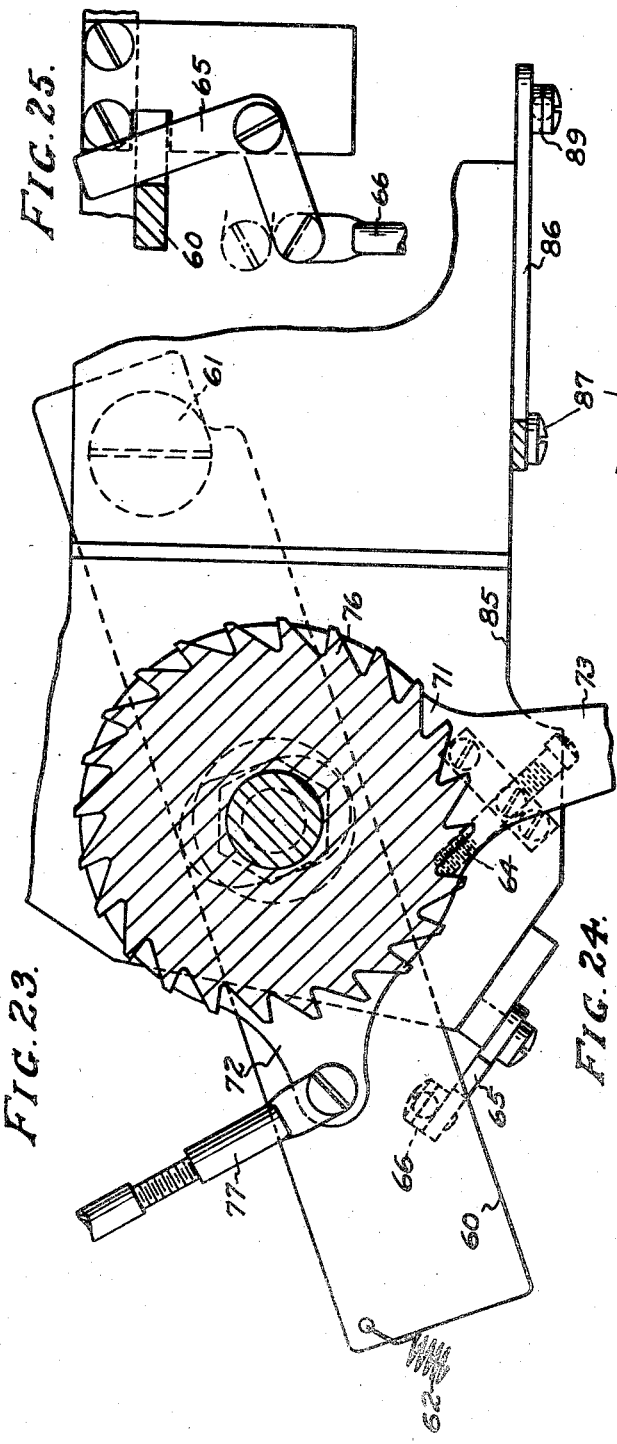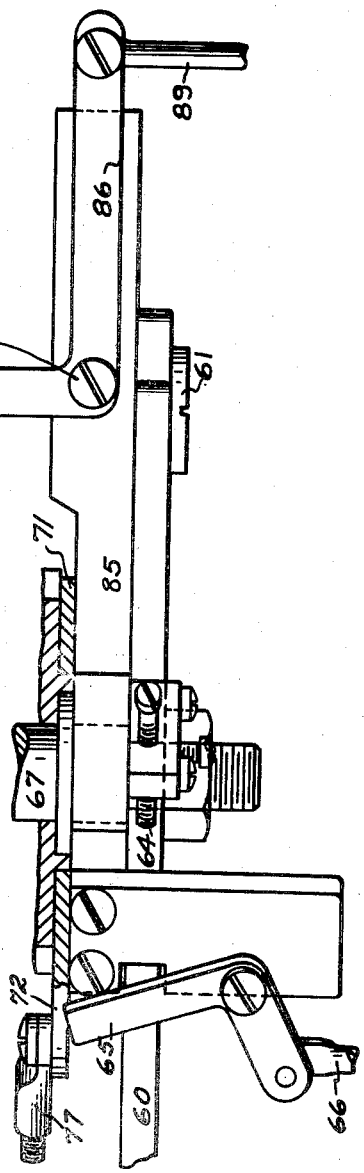

June 20, 1944.  I. H. C. GREEN  2,351,758
KNITTED FABRIC AND METHOD OF MAKING THE SAME
Filed Feb. 6, 1943  15 Sheets-Sheet 12

INVENTOR:
ISAAC H.C. GREEN,
By Rodney C. Southwest
ATT'y.

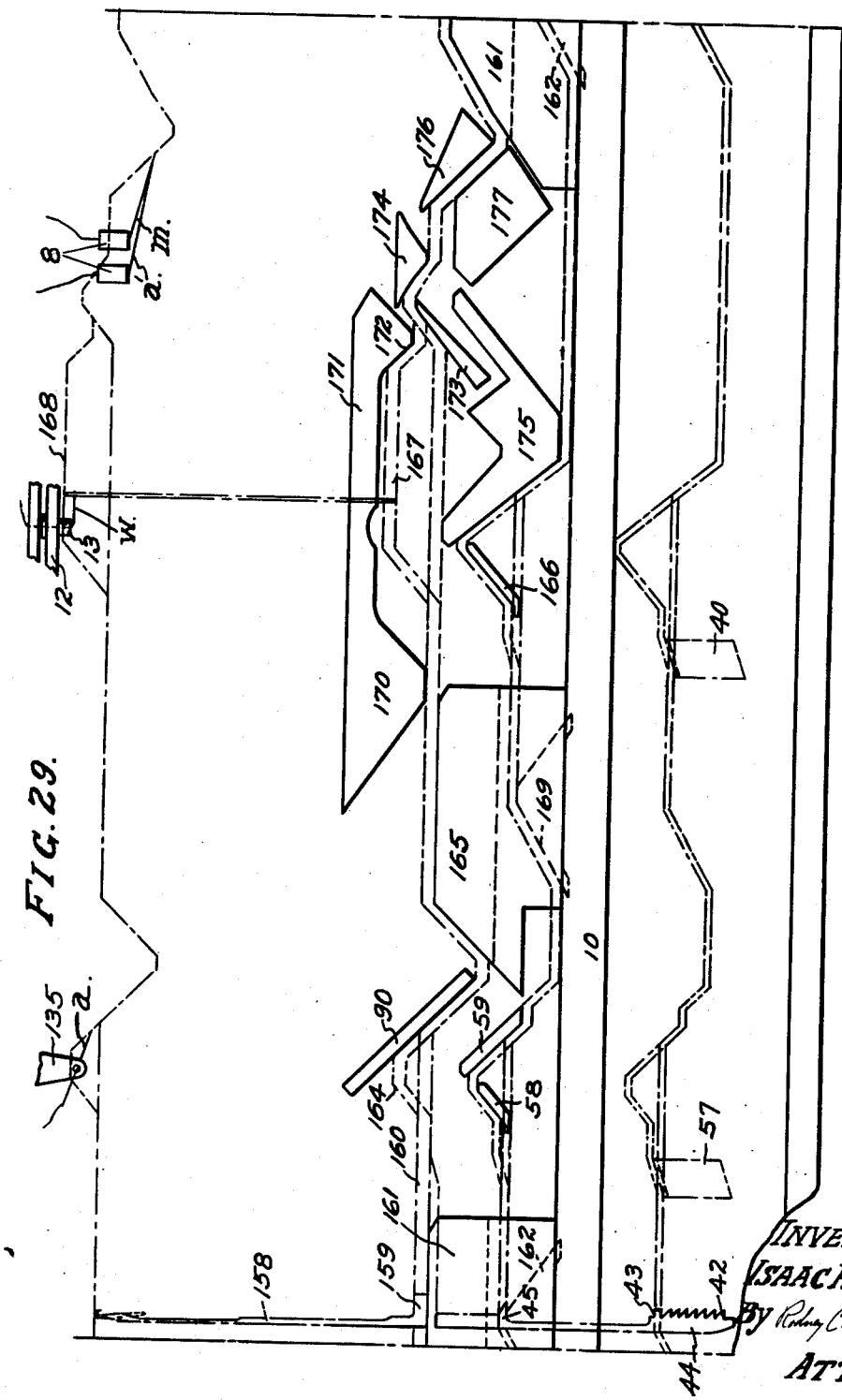

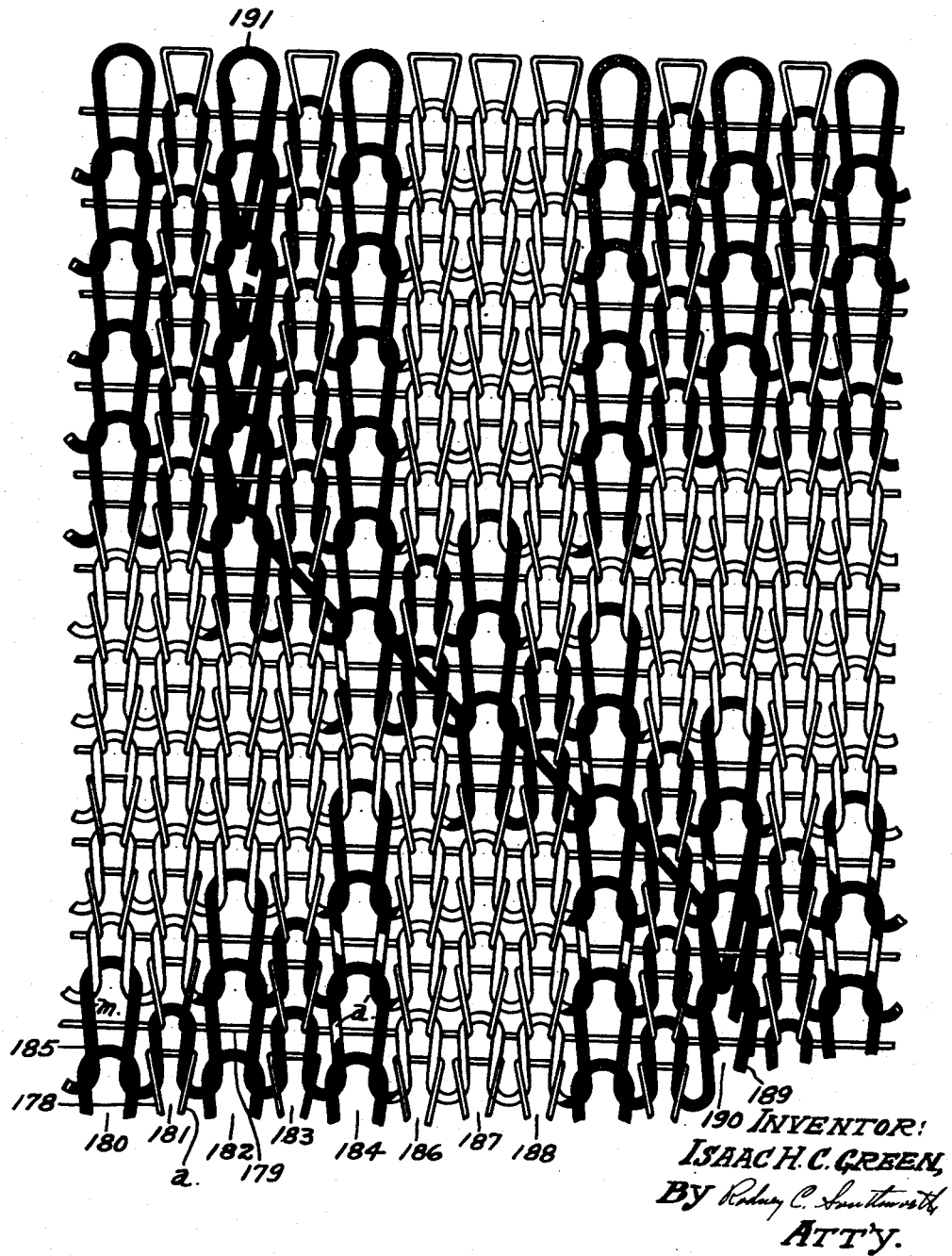

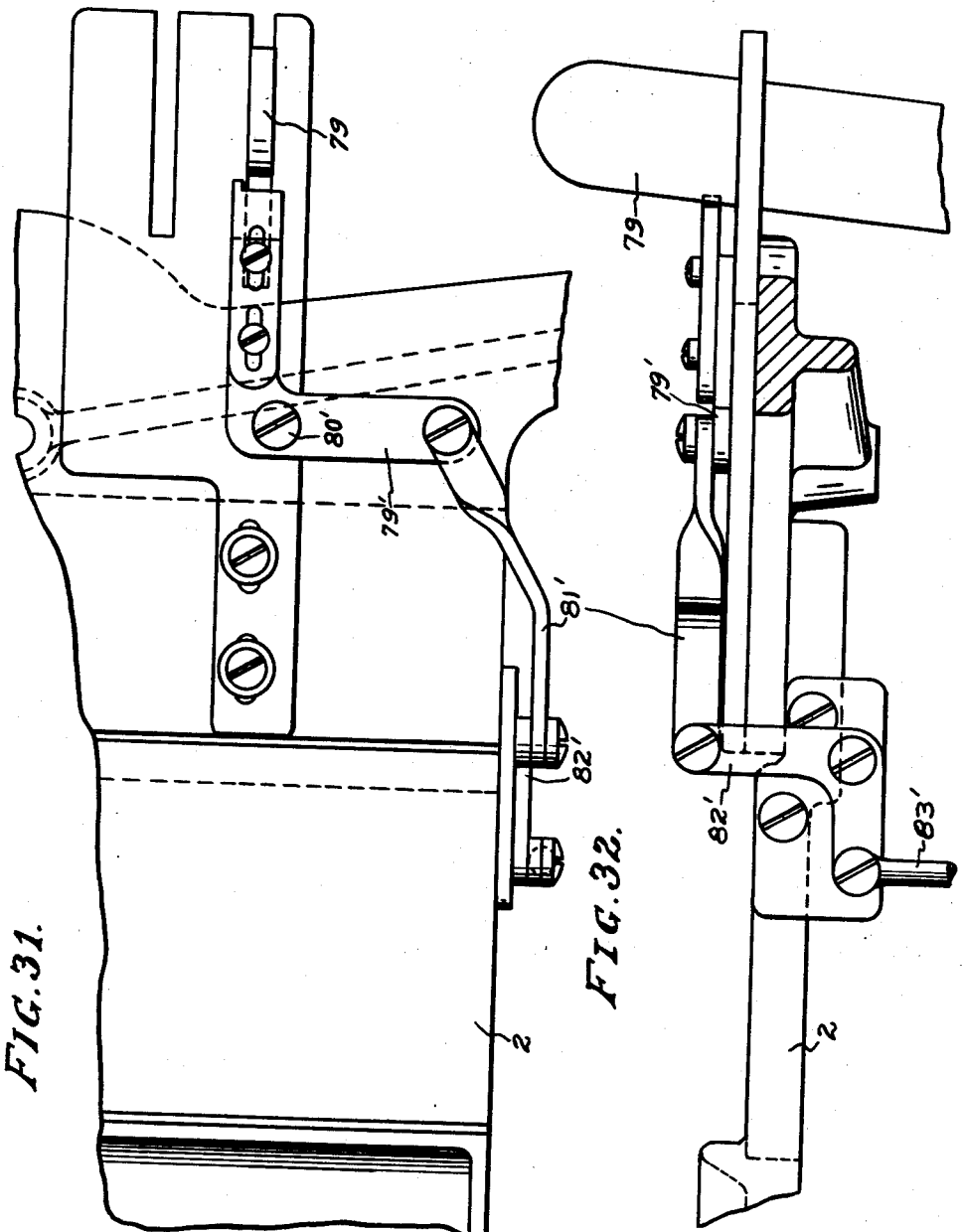

Patented June 20, 1944

2,351,758

UNITED STATES PATENT OFFICE 2,351,758

KNITTED FABRIC AND METHOD OF MAKING THE SAME

Isaac H. C. Green, Pawtucket, R. I., assignor to Hemphill Company, Central Falls, R. I., a corporation of Massachusetts Application February 6, 1943, Serial No. 475,020

12 Claims. (Cl. 66—180)

This case relates to a circular, independent needle type knitting machine adapted to knit fabric having raised patterns and in addition thereto, a true wrap pattern, these serving to impart to the knitted fabric an ornamental appearance which will resemble broad rib or links-and-links type patterns and in which those patterns, either with or without color effects being a part thereof, will also be supplemented by a true wrap figure appearing at desired points and according to predetermined patterns.

This case is a continuation as to all common subject matter of co-pending application Serial #443,083, filed May 15, 1942. The fabric is knitted at two feeds and the so-called raised areas are formed of accordian type fabric while the depressed areas are knitted by employing the two feeds, but as plain fabric. If two differently colored yarns are fed at these opposite feeds, the plain areas would have alternating courses knitted from the differently colored yarns. To avoid that, applicant feeds two yarns at the so-called main feeding station and reverse plates there at plain areas, the additional yarn fed being of a color and type to match the auxiliary yarn and to reverse plate the main yarn. This makes it possible to knit plain or depressed areas of one color, raised areas of a different color and to wrap with a still different color or colors as desired. Preferably the wrapping is done at the raised or face portions of the patterned fabric rather than at the so-called plain parts. That is not entirely essential and wrapping may be done at the plain areas, although at those areas, the wrap pattern would appear at those courses knitted at the main side only.

These and other features will be more distinctly set forth throughout the following description with respect to the accompanying figures of drawings:

Fig. 1 is an elevation taken at the left side of the machine and showing certain cams, control for the auxiliary yarn feed, and general location of two of the pattern means;

Fig. 2 is a small detail of connections applied to the control of the auxiliary yarn;

Fig. 4 is a plan view showing part of the mechanism illustrated in Fig. 3, also more of the machine extending to the right hand side;

Fig. 5 is an elevation at the left side of the machine showing the wrap drive and certain cam control means operable from a drum on the main cam shaft;

Fig. 6 is a plan showing certain details of control for the auxiliary yarn fed and the binder for that yarn;

Fig. 7 is an elevation showing that same mechanism;

Fig. 8 is a detailed view of the auxiliary yarn feeding finger and slide within which that finger works;

Fig. 10 is a detail view of the second lever from the end and of the cams which affect that lever;

Fig. 11 is a similar view of the third lever from the end;

Fig. 18 is a detail view of the stitch cam and parts applying thereto at the auxiliary feed;

Fig. 19 is an elevational view of the mechanism of Fig. 18;

Figs. 20, 21 and 22 show features of the auxiliary yarn binder;

Fig. 23 is a section showing the support for the raised fabric pattern drum, part of the ratcheting means for that drum and the mechanism for withdrawing it from action;

Fig. 24 is a partial sectional view through Fig. 23 and showing other features of the mechanism of that figure;

Fig. 25 is a detail view of lever which withdraws from action the drum mentioned with respect to Figs. 23 and 24;

Fig. 29 is a diagrammatic view of cams which affect needle and jack butts; and

Fig. 30 is a conventional illustration of a fabric produced on the machine herein described;

Fig. 31 is a plan view of a detail of the drum racking stop means; and

Fig. 32 is an elevation of the mechanism shown in Fig. 31.

Figure 3:
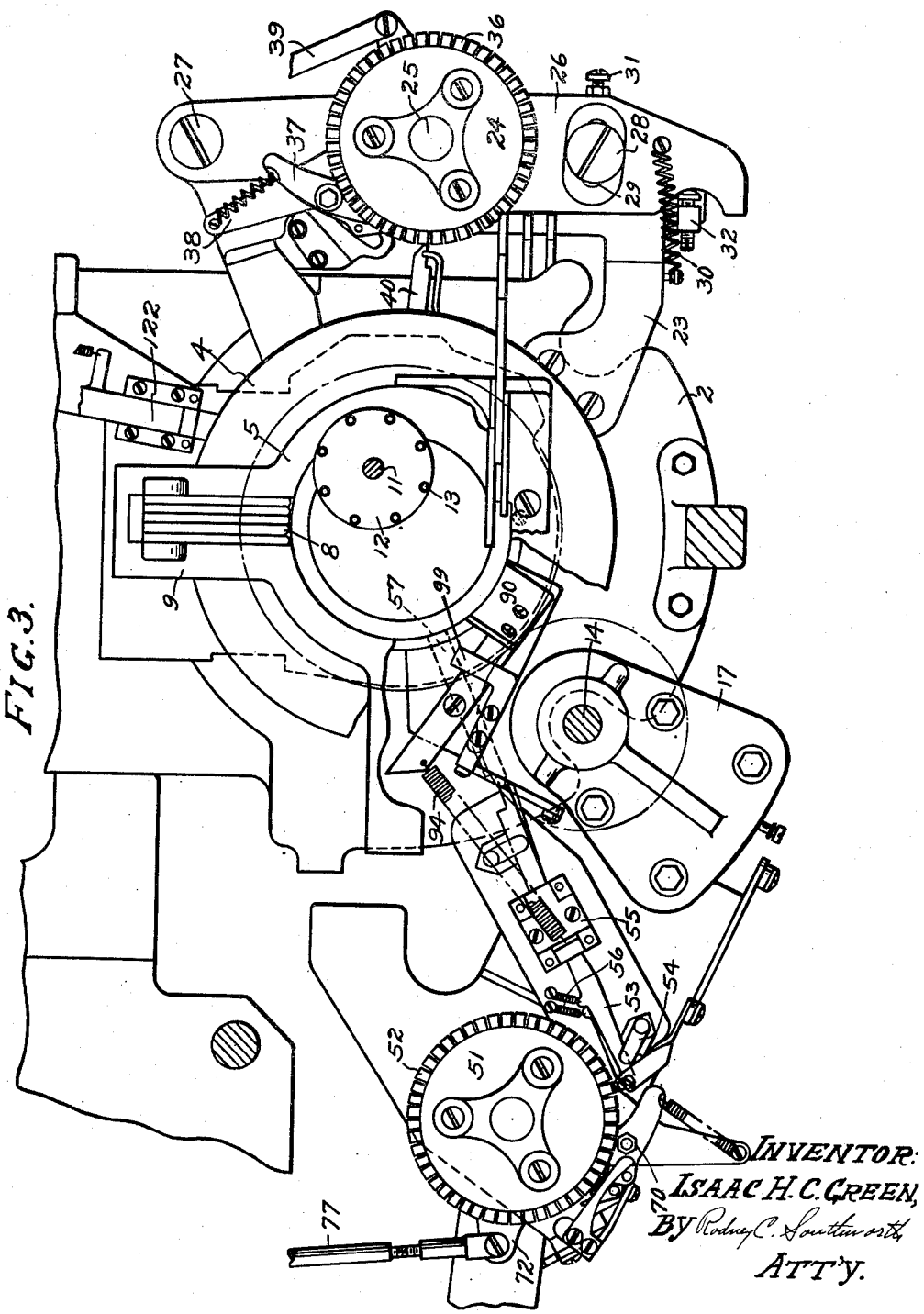
Fig. 3 is a plan of that mechanism illustrated in Fig. 1.

Now referring to the figures of drawings, one specific form of the invention will be described. The machine is of a type adapted to knit seamless hosiery and has a cylinder 1 rotatable in the usual way upon a circular base 2. This cylinder has the usual latch needles and sinkers functioning with those needles, said needles being carried in a sinker head 3 above which is a sinker cam cap 4. A carrier ring 5 is pivoted at 6 on a post 7. As in Fig. 3, this carrier ring has a plurality of yarn feeding levers 8 pivoted in an extension 9 to the carrier ring and these yarn feeding levers are controlled to feed and change yarns as in United States Patent #933,443.

Upon a cam plate 10 and at the right hand side of the machine, are mounted the usual needle cams such as effect stitch drawing in this type of machine. Those cams are not shown in detail, but will be described more specifically with reference to Fig. 29.

Wrap yarns are to be fed to certain selected needles by mechanism such as illustrated and described in United States Patent #1,702,608 and in this case the only part of that mechanism shown is a wrap yarn feeding spindle 11, disc 12 and eyelets 13 through which the several wrap yarns are threaded and fed. At the side of the circular base 2 a spindle 14 is rotatable and is driven by gears 15 and 16, Fig. 5, and through other gearing (not shown) serves to rotate the spindle 11 at a 1 x 1 ratio with the needle cylinder. Spindle 14 is guided in a bearing in bracket 17, said bracket extending upwardly as a post 18 to support other elements of the wrap mechanism all as shown in the patent just above mentioned.

Figure 9:
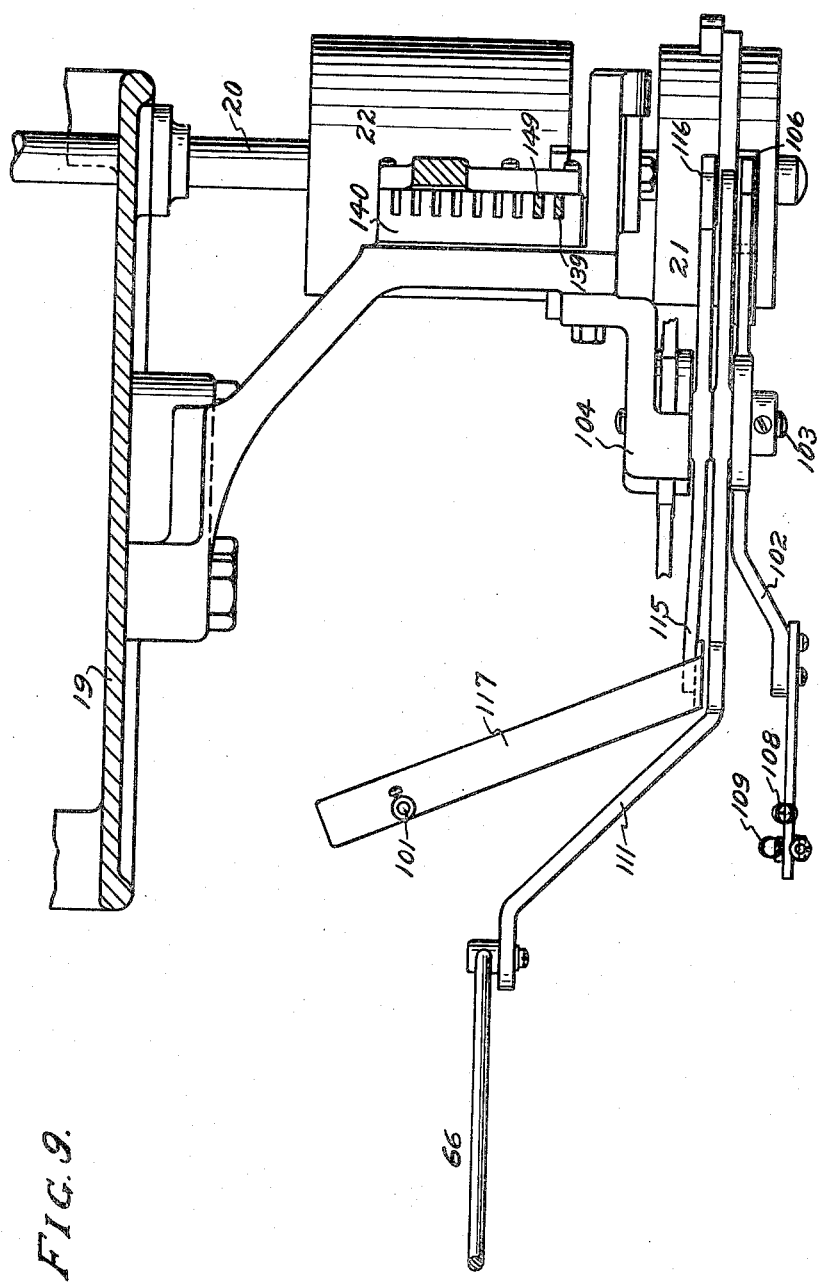
Fig. 9 is a section through part of the frame of the machine showing drums on the left hand end of the cam shaft and levers affected by cams on those drums.

The circular base 2 is attached at the upper side of the usual frame 19, Fig. 5, and that frame has rotatable in suitable bearings a main cam shaft 20 upon which are drums 21 and 22, Fig. 9. This cam shaft makes one revolution for each knitted stocking produced and the usual cams along with other cams later to be described, control the various functions of the machine. The only cams necessarily described here are those which affect feeding of the auxiliary yarn also control the pattern means at the back of the machine for the raised part of the fabric.

At the front of the circular base 2 is attached a bracket 23 and that bracket carries a pattern drum 24 rotatable on a spindle 25. The spindle 25 is really supported within an arm 26 pivoted on the bracket at 27 and guided at its other end by a shoulder screw 28 extended through a slot 29. A spring 30 is attached to the bracket and to the arm 26 and serves to pull that arm inwardly against an adjustable stop screw 31. A lever 32 pivots at 33 and by means of a connecting lever 34 and link 35, the drum 24 may be moved away from the cylinder when no wrap pattern is to be formed.

The drum 24 has a plurality of discs fixed thereto, each of said discs having frangible butts 36, it being understood that these butts may be broken off according to any desired pattern. All of the butts are shown intact here since this matter of setting up a pattern is one which a skilled knitter or knitting mechanic can do. The drum is ratcheted periodically by mechanism shown in United States Patent #1,702,608, that mechanism including pawls 37, a plate 38 and a link 39. The link 39 connects to other mechanism all of which is shown here since it is adequately described in the patent to which reference is made.

Figure 14:
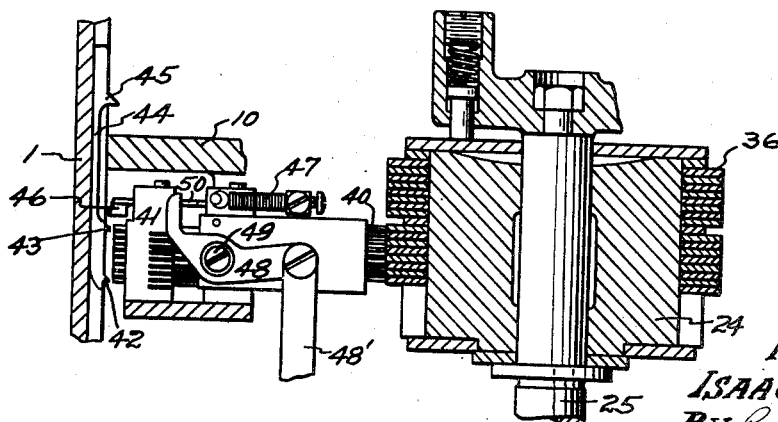
Fig. 14 is a detail view of the wrap yarn patterning means.

A series of plungers 40 (shown more clearly in Fig. 14) and guided within a bracket generally indicated by numeral 41, are contacted by the butts 36 and are moved inwardly or outwardly to and from the needle cylinder in accordance with the set up of the pattern. These plungers engage selecting butts such as the butt 42 or 43, Fig. 14, on jacks 44 and serve to select those jacks by imparting a short vertical movement thereto. Each jack has a master butt 45 the purpose of which will be described more fully as the disclosure progresses. The cam-ended plunger 46 works upon a butt at the upper end of one-half of the jacks (those at the sole side of the machine) and make it possible to pattern in the instep while making the sole of the stocking plain. This cam is drawn inwardly by a spring 47 and is moved out by a lever 48 pivoted at 49 and which hooks against a projection 50 at about the central part of the plunger. Link 48' connects to the lever 48 and controls knitting an unpatterned sole from suitable cams (not shown).

At the back of the machine and on the left hand side, mechanism is provided by means of which the needle jacks are selected to produce a 1 x 1 simulated rib top and also for the purpose of producing the raised fabric pattern throughout the leg and foot or other desired areas of a fabric. That jack selection is brought about by a pattern drum generally indicated by numeral 51, Figs. 1, 3, 13, 15, 16, 17, 23 and 24. That drum carries a plurality of pattern discs having frangible butts 52 which contact a series of levers 53, there being one lever individual to each row of butts 52. Those levers 53 are guided by the spacers 54 and pivoted within a supporting bracket 55. Springs 56 maintain the toe ends of these levers in contact with butts 52 or with the discs in the event butts are broken away.

The levers 53 engage at their opposite ends with a second group of levers 57, these levers having their inner ends so constructed as to engage the butts 42 to raise jacks 44 as they are selected preparatory to causing their needles to take the auxiliary yarn. Upon being selected, the jacks move vertically until their master butts 45 contact a master cam 58 whereupon the needles are raised to clearing and yarn taking height. After being raised up cam 58, the butts 45 engage and are drawn down by a cam 59, these cams being better shown in a diagrammatic view, Figs. 19 and 29.

The drum 51 and mechanism appurtenant thereto are mounted on a swinging bar 60, Figs. 23 and 24, that bar pivoting at 61 and being urged by a spring 62 in a direction to engage the toe ends of the levers 53. A stop screw 64 is adjustable and limits movement of the bar 60 as the drum moves to active position. To move that drum outwardly, a bell crank lever 65 connected to a link 66 is actuated as shown in Figs. 23, 24 and 25 and by means of connecting linkage and cams on the drum 21 all as will be described in detail in a later paragraph. The drum 51 rotates on a spindle 67 and is ratcheted by means of pawls 68 and 69, Figs. 15 and 17, those pawls being pivoted at 70 on a plate 71 having arms 72 and 73. Springs 74, one for each pawl, maintain them in contact with teeth 75 on the ratchet wheel 76.

A link 77 connects to the arm 72 and then extends across connecting to a bell crank lever 78, Fig. 4, one arm of which engages behind the lever 79. This lever 79 is contacted by certain cams on the 104-tooth gear and is thereby periodically moved to and fro to impart ratcheting movement to the front drum later to be described, that same motion being availed of to ratchet this drum 51. The lever 79 and its motion from the 104-tooth gear are fully described in United States Patent #2,211,785.

Figure 15:
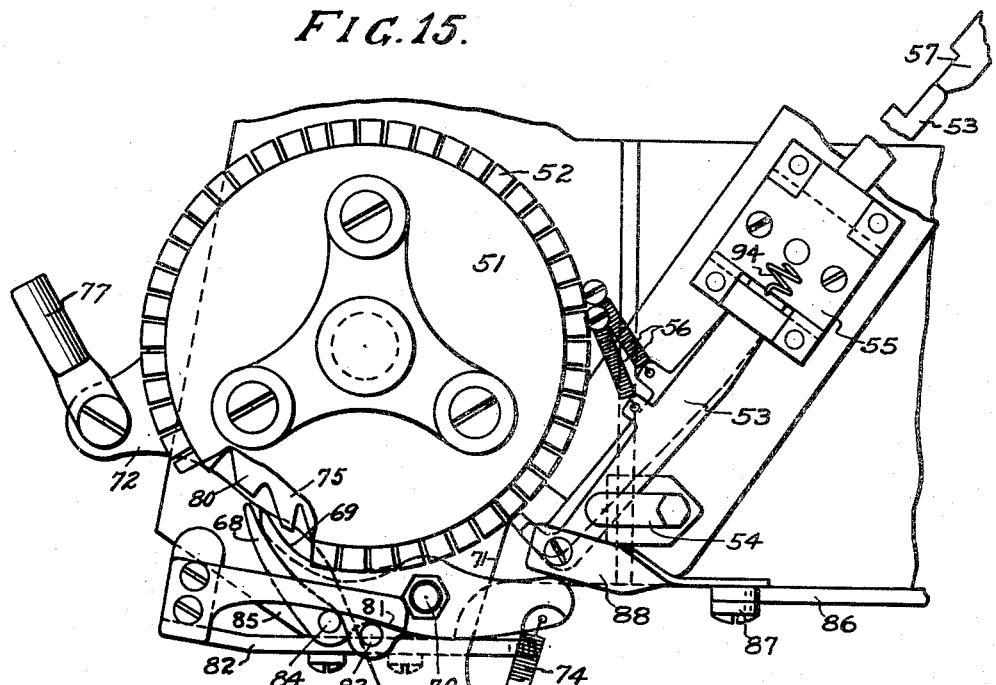
Fig. 15 is a plan view of the pattern means for controlling knitting of the raised pattern fabric.
Figure 16:
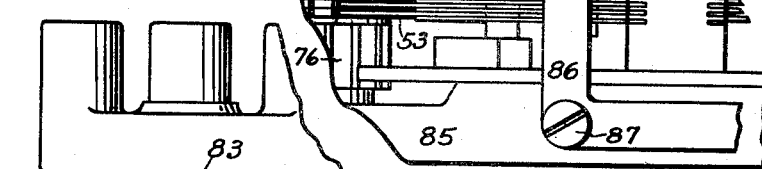
Fig. 16 is a detail of this mechanism showing control for knitting a 1 x 1 simulated rib top.
Figure 17:
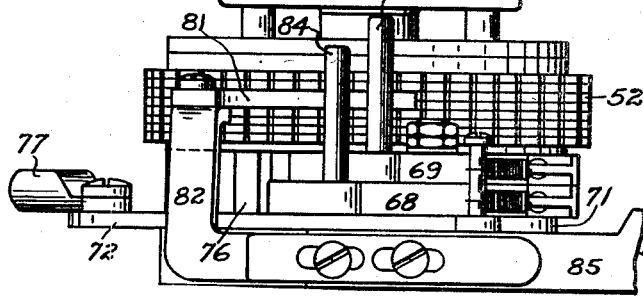
Fig. 17 is a detail of the mechanism of Figs. 13 and 15, but showing retiming means.

This drum 51 is retimed at appropriate intervals by mechanism shown in Figs. 3, 15 and 17. The ratchet wheel has one short tooth 80 and the pawls 68 and 69 which are normally urged inwardly against the ratchet wheel teeth may be drawn outwardly by means of a detent 81 connected to a bent bracket 82. The detent 81 contacts pins 83 and 84, the pin 83 projecting from the top pawl 69 and the pin 84 from the lower pawl 68.

During the knitting of the heel, drum 51 is stopped entirely and does not start again until the heel is finished and the foot commences. At that time both pawls are completely out of contact with ratchet wheel teeth as shown in Fig. 15, and also, the ratcheting means is stopped by means shown in Figs. 31 and 32.

In these figures the lever 79 is shown in practically its outermost position and when the ratcheting of drum 51 and also drum 120 is to be stopped, a bell crank lever 79' pivoted at 80' comes into the position of these Figs. 31 and 32, holding lever 79 outwardly so that it is not affected by the cam or cams which actuate it. A link 81' connects to bell crank lever 79' and to a second bell crank lever 82' which derives movement through a depending link or rod 83'. The link 83' extends down to other mechanism controlled by cams on one of the main cam drums and which initiates the stopping of the above mentioned ratcheting motion at the proper times.

During knitting the toe of a stocking, the drum is moved away from the pawls only far enough so that they fail to engage the short tooth 80. That means that the drum will be retimed as it is ratcheted up to the tooth 80 and will not start again until the pawls are allowed to engage to the fullest depth of the teeth.

The bracket 82 is fixed to extension 85 which projects from the rear part of the circular base. Those parts are stationary. The pawls are withdrawn when the bar 60 is moved to move the drum away from its active position. Of course the ratchet movement of plate 71 takes place no matter what the position of the drum.

As shown in Figs. 1, 3, 15 and 16, the topmost one of the levers 53 is specially controlled by a bell crank lever 86 pivoted at 87 and connected by a link 88 to the end of that topmost lever. This bell crank lever 86 is connected at its other end to a depending link 89 which extends downwardly to mechanism hereinafter to be described and by means of which properly timed impulses are imparted to the top lever 53.

Now referring to Figs. 1, 3, 18 and 19, an auxiliary stitch cam 90 is fixed to the end of a lever 91 pivoted at 92 on an extension 93 to the cam plate 10. This lever extends outwardly from the pivot 92, and by means of a spring 94, the lever is swung in such a direction that stitch cam 90 will normally be held inwardly against the needle cylinder.

A lever 95 pivoted at 96 extends upwardly as at 97 and then horizontally at 98 having connected thereto an angular piece 99 the end 100 of which is hooked about lever 91. A link 101 connects to the outer end of lever 95, and whenever that link is drawn downwardly, the hook end 100 will engage and draw lever 91 and stitch cam 90 out away from the cylinder to a position in which the cam will not contact any of the butts. Link 101 extends downwardly and connects to a lever or arm affected by certain cams on drum 21.

Now referring to Figs. 1, 3, 5, 9, 10 and 11, the drum 21, cams thereon and connections to certain links above mentioned are shown. In Figs. 5 and 9 the outermost lever 102 pivoted at 103 on the bracket 104 has a toe 105 which engages upon a row of cams including the cams 106 and 107. The lever 102 is connected to the lower end of link 89. A spring 108 connects to the lever 102 and to a fixed part of the machine and maintains the toe 105 in contact with one of the cams or downwardly on the cam drum.

Whenever the toe of the lever rides on one of the cams 106 or 107, the link 89 is pulled downwardly and the topmost lever 53 outwardly thereby projecting the appropriate plunger inwardly against the cylinder to engage and select jacks. The spring 109 is connected to link 89 and to the end of lever 102 and allows the link to elongate as its lower end slides in the clevis 110.

The second lever 111 has a toe 112 which bears upon cams 113 and 114 on the drum 21. This lever 111 is offset to the side and connects to the lower end of the link 66, that is, the link which connects to lever 65 to move the drum 51 for making a plain sole and also for stopping the pattern controlled by that drum altogether.

The third lever 115 has a toe 116 and an offset or bent projection 117 to which is attached the lower end of link or rod 101 by means of which the auxiliary stitch cam 90 is pulled away from the cylinder. The toe 116 is controlled by cams 118 and 119 which are properly positioned on drum 21 to effect the withdrawal of the cam 90 when desired.

Figure 26:
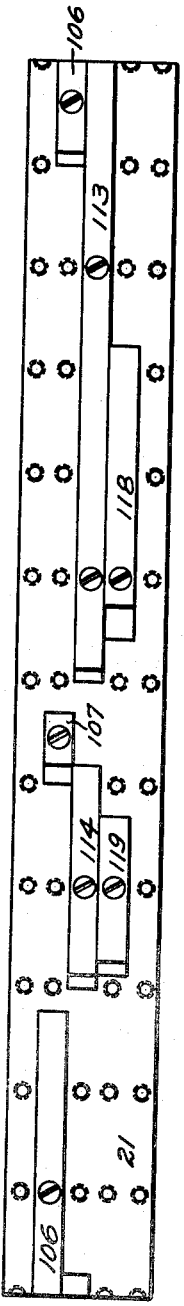
Fig. 26 is a developed view of the pattern drum at the extreme left hand end of the knitting cam shaft.

Now referring to Fig. 26, the cams just described and which are fixed to the drum 21 are shown in the relative positions which they occupy. Cam 106 lifts the toe of lever 102 and pushes the stop selecting plunger inwardly to make a 1 x 1 type rib construction at the beginning of the stocking top; that cam controls throughout the leg until the heel is reached. After dropping off cam 106 the plunger is out until starting the foot again at which time the cam 107 raises the toe 105 of the lever 102. At the start of the toe the plunger is again withdrawn and the toe of the lever rides on the drum throughout the toe, loopers rounds and throughout the starting of the top to a point where the 1 x 1 construction again commences.

Cams 113 and 114 which govern the so-called raised pattern are effective in the toe and throughout the start of the top, and in the heel, respectively. After going out of the foot, the drum 51 is moved away from levers 53 so that no raised pattern effect is possible until again starting in the leg. Of course, the top plunger controlled by the first part of cam 106 causes 1 x 1 raised fabric to be knitted just prior to starting in the leg. Cam 114 along with cam 106 prevents any type of raised pattern effect in the heel. According to the present set up 1 x 1 type simulated rib is knitted throughout the sole of the stocking rather than a plain knit sole.

The cams 118 and 119 which affect the position of auxiliary stitch cam 90 pull that cam out in the toe and in the heel.

Figure 12:
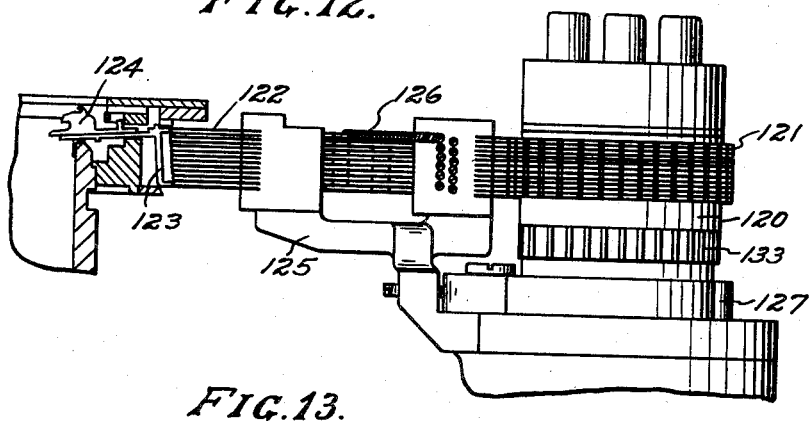
Fig. 12 is a detail of the pattern drum, plungers, and of a sinker and jack such as are employed for reverse plating at the main feeding side.
Figure 13:
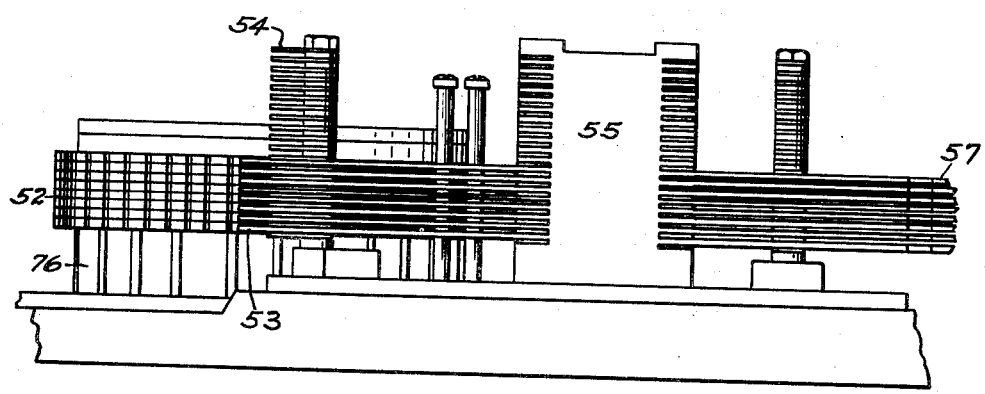
Fig. 13 is a detail of the pattern drum and certain levers at the back of the machine which are employed to select needles for knitting the raise pattern.

Now referring to Figs. 4 and 12, the drum controls plating and reverse plating through certain mechanism in the sinker cam cap 4. This drum 120 has a series of discs, each of which has a plurality of butts 121 which are removable and whereby a pattern is set up on the drum for controlling the position of a series of plungers 122. These plungers 122 contact butts on jacks 123, and those jacks, in turn, control the position of sinkers 124, all as described in United States Patent #2,052,777.

The plungers 122 are slidable in a bracket 125 which is attached to the circular base of the machine, and each of these plungers has a spring 126 by means of which it is held outwardly away from the butts on jacks 123 except as moved inwardly by the appropriate discs on drum 120. The drum 120 is rotatable on a movable bar 127, that said bar being capable of swinging about the pivot point 128 and having an elongated arm 129 to which is attached a lever 130. This lever 130 connects through to certain controlling means whereby the drum may be moved outwardly and the plated and reverse plated control thereby rendered inactive.

The drum 120 is racked periodically by pawls generally indicated by numeral 131 and which are spring pressed by springs 132 to engage a ratchet wheel 133 all as described in the patent just about mentioned. The mechanism for that purpose which is illustrated here includes the movable lever 79 before referred to, a connecting link 134, the pawls 131 and ratchet wheel 133. Retiming mechanism is also provided, but is not shown here since the same is described in United States Patent #2,052,777 and in other patents.

Figure 27:
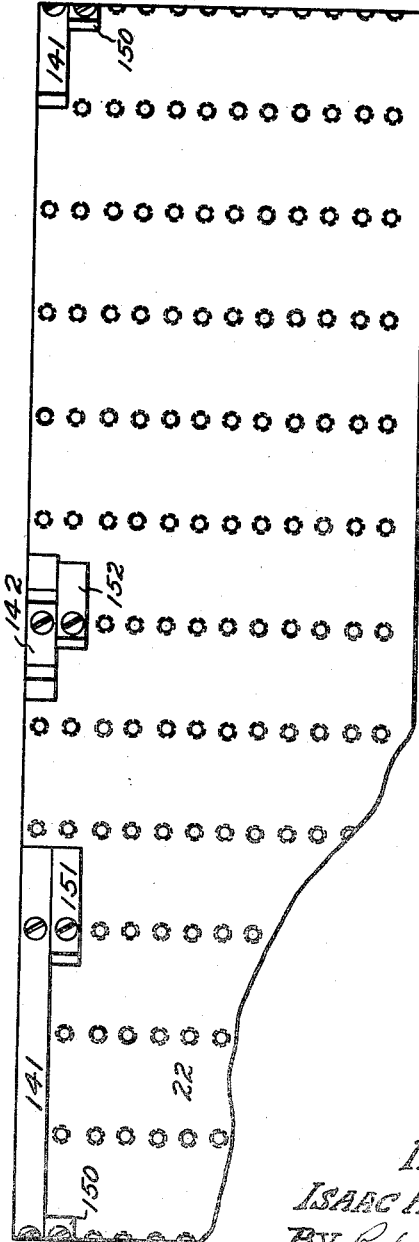
Fig. 27 is a developed view of the next drum on that shaft and showing two rows of cams which apply to the auxiliary yarn feed and the binder control.
Figure 28:
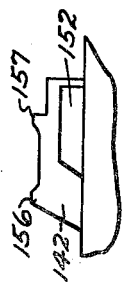
Fig. 28 is a detail of two of the cams on the drum shown in Fig. 27.

Now referring to Figs. 6, 7, 8 and 9, the auxiliary yarn designated by $a$ is fed through a yarn feeding finger 135 which slides vertically in a small crosshead 136. This finger 135 is moved by a lever 137 pivoted at 138 and connected by means of a depending link 139 to certain cams on the cam drum 22. This link 139 is guided in a bracket 140 and is engaged by cams 141 and 142, Fig. 27. The link 139 is forked at its upper end to engage about the outer end of the lever 137 and is also forked at the inner end to engage a pin 143.

In Figs. 20, 21 and 22, a yarn binder for the auxiliary yarn is mounted on a bracket 144 and includes binder elements 145 and 146. The element 145 is movable and is held upwardly or in closed position by means of a spring 147 except when opened by movement of lever 148 also pivoted at 138. The lever 148 also projects to the other side of the pivoted end and is engaged by the forked end of a second vertically disposed link 149. That link projects downwardly to be guided by the element 140 and contacts certain cams 150, 151 and 152 on the drum 22.

The binder, when opened, engages the auxiliary yarn $a$ as shown at Fig. 22, and then when closed, cuts that yarn and binds it in a known manner. The fixed binder element 146 of the binder is pressed by means of a spring 153 against the movable blade 145.

Spring 141 maintains the cutter and binder in closed position and forces the link 149 downwardly against the cams on the drum. A spring 154 connects to the outer end of lever 137 and to a fixed point on the supporting bracket and likewise, moves that lever 137 and the bar 139 so as to withdraw the auxiliary yarn from feeding position and maintain the bar down against its cams on the drum. All of this mechanism is supported on a bracket 155 which is in turn secured to the top surface of the carrier ring 5.

The cams 141 maintain the auxiliary yarn in feeding position throughout the knitting of the top and of the leg. Then in the foot cam 142 controls and that particular cam has two projections numbered 156 and 157 by means of which the yarn feeding finger is moved downwardly to a greater extent than for normal feeding so as to get that auxiliary yarn into all needles rather than into every other needle. The purpose of this is to make sure that there will be no eyelet when the yarn goes in and when it comes out, the first being at the close of the heel and the second at the start of the toe.

The cams which actuate the binder and cutter function as follows: Cam 150 opens the binder and cutter to allow the auxiliary yarn to be introduced to the needles at the start of the top. Cam 151 opens that binder and cutter so as to take the auxiliary yarn and cut and clamp it after finishing the leg and upon entering the heel of the stocking. Then at the start of the foot cam 152 causes the cutter and binder to open so that the yarn will be introduced to the needles, then holds those elements open so that upon completion of the heel, the yarn will be taken as shown in Fig. 22 and cut and clamped.

Referring to Fig. 29, cams, feeding means, pathways of needle hooks, needle butts and jack butts are shown. The needles 158 have butts 159 and at the left of the figure, those butts are moving along in the pathway 160 as they are guided by the raise cam 161. Jacks are leveled as the master butts 45 are raised above cam 162. Then as those jacks are selected corresponding needles are raised to take the auxiliary yarn, such selecting being accomplished as some one of the butts 42 or 43 engages a selecting plunger 57. After this preliminary selecting movement, master butts are engaged by cams 58 and the jacks will be raised so that needle butts reach a pathway 164 and needle hooks take yarn $a$.

Thereafter jacks are immediately moved downwardly by cam 59 while stitch cam 90 draws all needles down, the yarn $a$ being knitted by those needles which took it in their hooks. It is floated behind other needles. The level 164 for the needle butts is such that latches are cleared preparatory to taking the new yarn.

After passing the auxiliary feeding and knitting point needle butts are again raised to a point 160 by raise cam 165. At the plungers 40, a second selection takes place and master cam 166 will raise selected jacks so that corresponding needles are elevated to a point where butts pass along in pathway 167.

That is a wrap level and the hooks of those needles reach the pathway 168 taking wrap yarn $w$ fed by eyelets such as the eyelet 13 in disc 12. Preparatory to being selected, a cam 169 levels jacks and the top instep cam 170 levels needle butts providing some of those butts might be riding above cam 165. The cam 170 extends horizontally at 171 and then terminates in a cam point 172, the latter acting to move wrap needles down so that they will first engage the front stitch cam 173 to be raised slightly before passing under center guard cam 174. The non-selected needles ride along above cam 175 and engage the front stitch cam thereby being raised to clear their latches. The needles selected to be wrapped would have cleared their latches prior to being wrapped. All needles take the main yarn or yarns $m$ fed by one of the main yarn levers 8. After taking that yarn, those needles are drawn down as their butts move down the rear stitch cam 176. The center raise cam 177 performs the usual function. All jacks are lowered by cam 175.

In knitting fabric according to the method and with the machine herein described, two yarns are preferably fed at the main feeding station and one of those yarns is so selected as to match in color and appearance the auxiliary yarn $a$. At the plain areas, so-called, that matching yarn is used to plate over the other yarn fed at that side in those courses knitted at the main side. In this way the plain areas are of a single color and yet, the yarn at the auxiliary side and that at the main side are primarily of different colors so that in the pattern work there are two basic colors plus other colors for the wrap yarn.

In these plain areas the control for sinkers as described with respect to Fig. 12 provides for reverse plating of the two yarns at the main side so that the above mentioned result is attained. Of course, other methods of plating and reverse plating may be employed, but this preferred method and mechanism are described by way of example.

Now referring to Fig. 30 in which a section of fabric is illustrated, and in which the knitting runs from the bottom to the top of the figure, course 178 is knitted at the auxiliary side and from the yarn $a$. In the so-called raised or face areas, that yarn is knitted at alternate wales and floats as at 179 behind intermediate wales. The wales 180, 181, 182, 183 and 184 are so knitted as to constitute a raised or face area of the fabric. At the next course 185, and at raised areas, the main yarn $m$ is knitted at each wale and is plated over a second yarn knitted at the main feeding station and which matches yarn $a$ insofar as color or appearance goes. That plating yarn is designated as yarn $a'$ and is of about the same size as yarn $m$ so that when reverse plating takes place the yarn $m$ will be covered or hidden.

At the wales 186, 187 and 188, a so-called plain area which appears at a lower level as compared to the face area, is formed by knitting yarn $a$ at each alternate course and yarns $m$ and $a'$ at intermediate courses. At these areas the yarn $a'$ reverse plates so as to cover the yarn $m$. Since the yarns $m$ and $a$ are of contrasting colors, the raised areas and plain areas appear of those different colors and the fact that yarn $a$ is knitted in the raised area, and is of a different color from $m$, does not detract from the clear, single colored appearance of those areas since yarn $a$ is very fine and is drawn into rather tight stitches. It also floats in back of the wales 180, 182 and 184 and pushes those wales to the front giving a ribbed appearance and concealing the wales 181 and 183.

The general pattern shown in this Fig. 30 is that of a chain stitch or link type of pattern and the raised patterned areas at the right of the plain area running through the center are similar except they are stepped up a few courses so that there is a diagonal connecting line running upwardly from right to left through the central plain sections.

A wrap yarn 189 wraps in the wale 190 and then crosses over wrapping in every other wale to the wale 191 at the left hand side. This wrap yarn is of a third color and is wrapped so as to stand out at the face wales of the raised areas. Of course, this is only illustrative of one particular pattern and there are many other patterns and variations of wrap striping designs possible of being used. It is also true that the shape of the raised and plain areas may be varied in contour or in size, that illustrated here being merely one possible pattern.

*Operation*

In knitting a stocking of the type herein described, at the start of the top, an edge such as an outturned welt or the like is first produced whereupon the top is shifted as a 1 x 1 simulated rib top or of accordion type fabric. At that time the toe of lever 102 rides up on cam 106 pulling the top lever 53, Fig. 3, in a direction to push in the topmost plunger 57. That causes every other needle to be brought up at the auxiliary feed to take yarn $a$ and at the main feed all needles knit a yarn.

At the completion of the top the leg is started and to form the raised pattern, cam 106 still continues to control through the top plunger 57 so that every other needle will always be raised at the auxiliary side. However, at that time, the second lever 111 drops from the cam 113 allowing the drum 51 to move into position so that the pattern set up on that drum may control the remainder of the plungers 53. Then the raised areas will be made at such points as alternate needles take yarn $a$ while at plain areas the pattern means will cause all needles to rise at that side knitting yarn $a$ at each wale in those plain areas. Of course, at this time the knitting cam 90 is in against the cylinder since neither of cams 118 or 119 is acting upon the third lever 115.

At the start of the top the cam 141 causes the yarn $a$ to be fed through mechanism described heretofore, cam 150 also opening the binder at that time so as to release the yarn for feeding.

After knitting the leg and upon starting the heel the yarn $a$ will be withdrawn as link 139 drops from cam 141 while cam 151 will again open the binder to receive the withdrawn yarn. Then during the heel the pattern drum 51 is moved away from the levers 53. That is accomplished as the second lever 111 is raised on cam 114. Ratcheting of drum 51 is then discontinued throughout heel knitting. At the same time the third lever 115 is raised by cam 119 and the stitch cam 90 moves away from the cylinder to an inactive position. The lever 102 is also dropped from cam 106 and the top plunger 57 is withdrawn so that jacks are not affected.

At the close of the heel and start of the foot, lever 102 is again raised by cam 107 and the foot is knitted with a pattern in the instep but merely as a 1 x 1 mock rib in the sole. The pattern drum 51 again moves to active position and cam 90 moves into its butt engaging position.

There is a plain sole cam (not shown but similar to that shown at 46, Fig. 14) at the auxiliary side and that works upon butts 43 to prevent a pattern being knitted similar to that in the instep, but which does allow the 1 x 1 rib to be knitted. Butts 43 are missing entirely at the instep side of the machine, but at the sole side those butts 43 are on every other jack only. Thus a 1 x 1 type rib can be knitted since needles above jacks which do not have the butt 43 will be elevated by top cam 163 and will take the yarn a. Then if any plain areas are selected by plungers beneath the topmost plunger 57, the plain sole cam will immediately lower those jacks since they will have the butt 43 on them.

After knitting the foot, the toe is started and at that time, the drum 51 is moved part way from the lever 53 so that only one pawl will engage the ratchet wheel teeth. Then that pawl will ratchet the drum until the short tooth 80 is reached whereupon no further movement is possible until the drum is again moved back to active position. That provides for retiming prior to starting another pattern. Cam 113 provides for the retiming function as just described.

Cam 118 will withdraw the auxiliary yarn knitting cam 90 and at this time, the top plunger 57 will be withdrawn as it was during the heel.

During knitting the foot cams 142 and 152 control the feeding of the yarn a and the binder and cutter for that yarn. Upon starting the toe the link 139 and 149 drop from those cams and that yarn is not fed again until the top is started. Knitting continues throughout the toe, loopers rounds, separating courses and beginning edge of the next top whereupon the cycle starts again.

The invention has been described by illustrating and explaining the operation of one specific type of machine to which it has been applied. The pattern set up is merely illustrative and wide variation can be resorted to by those skilled in the art without departing from the original concept. The invention is not limited other than by the scope of the appended claims.

I claim:

1. A plain knitted fabric having portions thereof the surfaces of which are disposed of different levels so that one stands out at the face of the fabric, and having at those areas which stand out at the face two yarns knitted in consecutive courses, one in all wales and the other in spaced wales only, and in those areas which remain at a lower elevation or do not stand out at the face of the fabric having both of said yarns knitted in all wales and a true wrap yarn pattern knitted in at least some of said areas which stand out at the face of the fabric.

2. A plain knitted fabric having patterned areas some of which stand out at the face of the fabric and others of which remain at a level lower than the surface of those areas first mentioned, said fabric being knitted from two yarns one of which is of finer count than the other, the said yarn of finer count being knitted at spaced wales only in areas which stand out from the face of the fabric, but at all wales on the said areas which remain at the said lower elevation or do not stand out at the face of the fabric and a true wrap yarn pattern knitted in at least some of said areas which stand out at the face of the fabric.

3. A plain knitted fabric having patterned areas some of which stand out at the face of the fabric and others of which are interspersed between the borders of said areas which stand out from the face of the fabric and assume a lower elevation as compared to the face of the first mentioned area, said fabric being knitted from two yarns one of which is of substantially finer count than the other, said yarns being knitted alternately in consecutive courses and at the said areas which stand out from the face of the fabric, the yarn of finer count being drawn into knitted stitches at alternate wales only and a true wrap yarn pattern knitted in at least some of said areas which stand out at the face of the fabric.

4. A plain knitted fabric having portions thereof the surfaces of which are disposed at different levels so that one stands out at the face of the fabric, and the other remains at a lower elevation as compared to the first mentioned, the first mentioned areas having alternate courses knitted from a relatively fine yarn drawn into loops at alternate wales only and intermediate courses knitted from two yarns one of which is plated over the other, the said areas which remain at a lower elevation being knitted from the same yarns but having the yarn knitted in alternate courses drawn into a knitted loop at each wale and the two yarns knitted in intermediate courses being reverse plated as compared to their relationship in the first mentioned areas.

5. A plain knitted fabric having portions thereof the surfaces of which are disposed at different levels so that one stands out at the face of the fabric, and the other remains at a lower elevation as compared to the first mentioned, the first mentioned areas having alternate courses knitted from a relatively fine yarn drawn into loops at alternate wales only and intermediate courses knitted from two yarns one of which is plated over the other, the said areas which remain at a lower elevation being knitted from the same yarns but having the yarn knitted in alternate courses drawn into a knitted loop at each wale and the two yarns knitted in intermediate courses being reverse plated as compared to their relationship in the first mentioned areas and having at certain areas a wrap yarn pattern knitted in predetermined wales and courses.

6. A method of knitting a plain (not rib) fabric including the steps of feeding and knitting three yarns, two of said yarns in all wales at alternate courses and the other said yarn at non-adjacent wales at certain areas and at other areas in all wales, and plating the said two yarns at those areas in which the third yarn is knitted at non-adjacent wales while reverse plating those yarns at the remaining areas.

7. A method of knitting a plain (not rib) fabric including the steps of feeding and knitting three yarns, two of said yarns in all wales at alternate courses and the other said yarn at non-adjacent wales at certain areas and at other areas in all wales, and plating the said two yarns at those areas in which the third yarn is knitted at non-adjacent wales while reverse plating those yarns at the remaining areas and knitting a true wrap stripe pattern at predetermined wales and courses of the fabric.

8. A method of knitting a plain (not rib) fabric including the steps of feeding and knitting three yarns, two of said yarns in all wales at alternate courses and the other said yarn at non-adjacent wales at certain areas and at other areas in all wales, and plating the said two yarns at those areas in which the third yarn is knitted at non-adjacent wales while reverse plating those yarns at the remaining areas and knitting a true wrap stripe pattern at predetermined wales and courses in those areas in which the other said yarn is knitted at non-adjacent wales only.

9. A method of knitting a plain (not rib) fabric including the steps of knitting two yarns, one said yarn in all wales at each course and the other said yarn at all wales in certain areas of said fabric but at spaced wales only at those areas whereby said first mentioned areas will appear at a relatively low elevation and the other said area will appear raised as compared to said first mentioned areas and knitting a true wrap yarn pattern at predetermined wales and courses in the fabric.

10. A method of knitting a plain (not rib) fabric including the steps of knitting two yarns, one said yarn in all wales at each course and the other said yarn at all wales in certain areas of said fabric but at spaced wales only at those areas whereby said first mentioned areas will appear at a relatively low elevation and the other said area will appear raised as compared to said first mentioned area and knitting a true wrap yarn pattern in predetermined wales and courses in the said areas of the fabric in which one of the yarns is knitted at all wales and the other said yarn is knitted in certain wales only.

11. A method of knitting a plain (not rib) fabric to ornament the same by relatively raised and depressed areas at the surface of the fabric which includes the steps of feeding two yarns one of which is appreciably finer than the other, and so controlling the knitting of said yarns that at depressed areas both yarns are drawn into knitted stitches in their respective courses and in all wales within said depressed area, while at relatively raised or elevated surfaces or areas, the said finer yarn is drawn into stitches at alternate wales and is floated behind intermediate wales, and knitting a true wrap yarn pattern in predetermined wales and courses of those areas which appear relatively raised at the face of the fabric.

12. A method of knitting a plain (not rib) fabric and ornamenting the same with relatively raised and depressed areas and with a true wrap pattern including the steps of feeding one yarn at one feeding station and two yarns at a second feeding station and feeding supplemental wrap yarns in advance of the said second mentioned station, knitting said two yarns at every other course in the fabric at substantially all wales, causing the yarn fed at the first mentioned feeding station to be knitted at alternate wales only in predetermined areas and at other areas in each wale, and knitting said wrap yarns to be plated over predetermined stitches in those areas in which the yarn fed at the first mentioned feeding station is knitted at spaced wales only, and the further step of plating the two yarns fed at the second mentioned feeding station at those areas in which the said one yarn is fed at non-adjacent wales while reverse plating those two yarns at other areas.

ISAAC H. C. GREEN.